Oct. 25, 1938.　　　　F. HANSGIRG　　　　2,134,249
PRODUCTION OF WATER ENRICHED WITH HEAVY WATER
Filed Dec. 3, 1935
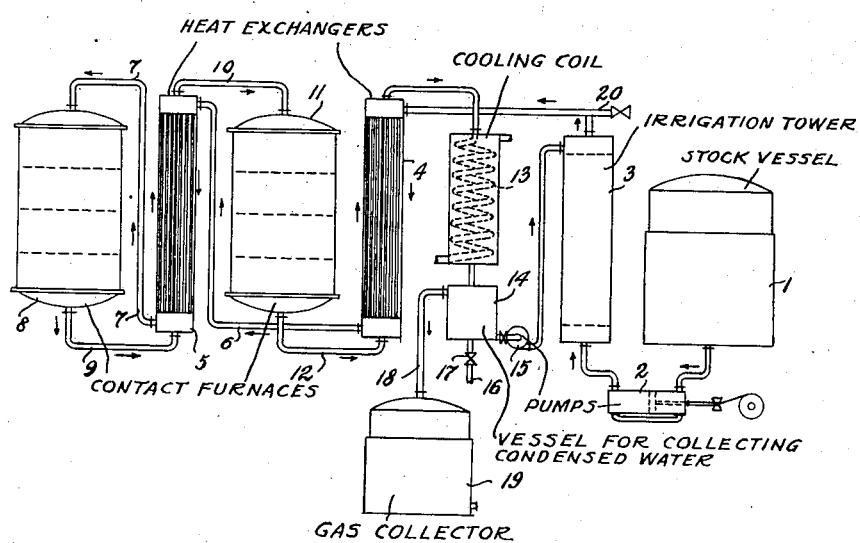
INVENTOR
Fritz Hansgirg,
By Watson, Coit, Morse & Grindle
ATTYS.

Patented Oct. 25, 1938

2,134,249

UNITED STATES PATENT OFFICE 2,134,249

PRODUCTION OF WATER ENRICHED WITH HEAVY WATER

Fritz Hansgirg, Konan, Korea

Application December 3, 1935, Serial No. 52,707
In Austria December 6, 1934

6 Claims. (Cl. 23—204)

The invention relates to the production of water enriched with heavy water.

It is an object of this invention to provide a simple and economical process for producing water enriched with heavy water, more particularly as a by-product from technical processes which yield hydrogen gas by reduction of water.

It is known to obtain heavy water by continued electrolysis of dilute alkalies or acids, the remaining water becoming thereby enriched with the heavy hydrogen chemically combined in the form of deuterium hydroxide and deuterium oxide. By continued electrolysis it is possible in this manner to arrive at heavy water of hundred percent strength or almost hundred percent strength. However, this method of production, which can only be carried out with the aid of special apparatus, involves heavy consumption of electrical energy, and is in addition cumbersome since the unavoidable increase in concentration of the electrolyte must be counteracted by frequently repeated intermediate treatment, either by distilling the water off from time to time or by frequently precipitating out the electrolyte. In order to work with greater economy the recovery of heavy water as a by-product of the large scale electrolysis of water conducted for the purpose of producing hydrogen gas would suggest itself as an obvious expedient. But this course is rendered unfeasible by the fact that electrolysis with the object of enriching the electrolyte solution with heavy water precludes the intermittent diluting of the electrolyte, so that in practice it only becomes possible to effect an enriching to quite a slight percentage on account of the inevitable increase in the concentration of the electrolyte.

These conditions are altered when the object is to obtain pure deuterium oxide from water which is already enriched to a considerable extent with heavy water, since in this case quantities of water are subjected to electrolysis which only amount to between a thousandth and a two-thousandth part of the original starting quantity of natural water: consequently the amount of electrical energy required is not great, and on account of its slight capacity the appartaus required it not costly and is easy to operate.

The process according to the present invention for the production of heavy water consists essentially in causing reactions yielding hydrogen gas by reduction of water, which proceed (if desired with catalytical acceleration) to equilibrium or approximately to equilibrium, to take place at as low temperatures as possible, and in repeatedly returning into the reaction the water enriched with deuterium hydroxide and deuterium oxide left behind in the reaction. The invention utilizes the facts that the equilibrium of the reaction $$DHO + H_2 \rightleftharpoons DH + H_2O$$

is favorable for the formation of deuterium hydroxide at temperatures below about 2000° K., and is the more favorable for enriching deuterium in the form of hydroxide the lower the temperature is, the equilibria of this reaction as well as of the reduction reaction being established. In this manner it has become possible to arrive at a very simple process for the large scale production of water which is enriched with heavy water, and, if desired, may be further worked up by other methods (more particularly electrolytic). The equilibrium conditions are particularly favorable at temperatures below about 700° K., since from this temperature downwards the equilibrium constant $$K = \frac{[DHO] \times [H_2]}{[DH] \times [H_2O]}$$

increases greatly as the temperature falls, whereas the curve representing this equilibrium constant as function of the temperature is flat from about 700° K. onwards.

According to a preferred form of the process of the present invention enriched water is obtained as a by-product of technical processes proceeding on the basis of equilibrium reactions, in which processes water vapor is reduced to hydrogen gas, by condensation of the surplus water and employment of this water in circulation, catalyzers of the reduction reaction on which the technical process in question is based being preferably employed for establishing the equilibrium. More particularly the known processes for the technical recovery of hydrogen by catalytically accelerated conversion of carbon monoxide with water vapor or for the removal of carbon monoxide from gas mixtures containing carbon monoxide by catalytically accelerated oxidation with water vapor have proved suitable for this purpose. In these technical processes it is usual to employ an excess of water over the stoichiometrically requisite amounts in order to assist in obtaining a practically complete conversion of CO. The employment of an excess of water is desirable for obtaining heavy water as a byproduct of the reduction reaction even if in this reduction reaction the equilibrium be displaced in favor of hydrogen formation by continuous removal from the gaseous phase of the carbonic anhydrides formed.

It may be desirable in the recovery of heavy water as a by-product of technical processes taking place according to equilibrium reactions, to carry the enriching in the first instance only to a certain deuterium hydroxide and deuterium oxide concentration (dependent on the conditions of the technical process concerned), and subsequently to introduce the enriched water into a process carried out at a lower temperature than that observed in the first process, in order in this way to increase still further the degree of heavy water concentration of the water. In any case further concentration of heavy water or preparation of the same in the pure state can be effected by known methods, preferably by electrolysis.

An embodiment of the present process carried out with a plant diagrammatically illustrated in the accompanying drawing will now be described.

Water gas of the composition 50% CO and 50% $H_2$ with the natural heavy hydrogen content (in the main present as DH) is conveyed by a pump 2 from a stock vessel 1 to an irrigation tower 3 and is charged with so much steam, fed through the pipe 20, that for every mol. of carbon monoxide there are present 3 mols of water vapor with the natural heavy water concentration (heavy water being present mainly as DHO) of approximately 1:2500 ($DHO:H_2O$). Then the water gas thus charged with steam is conducted through heat exchangers 4, 5 connected with each other by a pipe 6, in which it is pre-heated to the required temperature, and through the pipe 7, into a contact furnace 8 in which the conversion of carbon monoxide and steam to carbon dioxide and hydrogen is carried out at temperature between 400° and 500° C. At the same time the equilibrium of deuterium in hydrogen gas and water vapor for this temperature becomes established.

As catalyst there may be employed for example a mixture of caustic burned magnesite, finely ground calcined potassium carbonate, and wood charcoal, in which magnesite and potassium carbonate are each contained in a proportion of 15%, and wood charcoal in a proportion of 70%. The mixture, in a finely ground condition, is granulated by the aid of an aqueous emulsion of asphalt, and is heated to 600-800° C. out of contact with air.

The catalyzed gaseous mixture flowing out from the bottom of the contact furnace 8 then passes through pipe 9 into the heat exchanger 5 where it flows in counter current to the starting gas introduced at the top of the heat exchanger, and is cooled to the desired intake temperature of the second contact furnace 11, to which it is conducted through pipe 10, so that the contact mass can attain a final temperature of about 320° C. The equilibria appropriate to this temperature are again established here. The hydrogen leaving the contact furnace 11 through pipe 12 still contains about 2/3 of the originally introduced quantity of steam and in addition $CO_2$ and a slight remainder (2-3%) of carbon monoxide. This steam now contains deuterium hydroxide already in a concentration of about 1:2200 (degree of enriching approximately 14%).

The reaction mixture passing through pipe 12 flows, for the purpose of cooling, through the second heat exchanger 4, through which it passes in counter current to the starting gas, and then enters a cooling coil 13 cooled from the outside. The condensed water flows into vessel 14 whereas the gaseous reaction mixture passes through pipe 18 and is collected in the vessel 19. The hot water is conveyed from vessel 14 by a pump 15 to the irrigation tower 3 in which a preliminary saturation of the starting gas with this enriched steam takes place so that only one third part of the originally introduced quantity of steam must be added fresh through pipe 20. The procedure is repeated in the above described manner, the deuterium hydroxide concentration in the starting mixture, in which there are again 3 mols of water vapor for every mol. of CO, being now 1:2300. The approximate quantity of 2 mols of water vapor remaining at the conclusion of the second phase of the process for every 3 mols present in the starting mixture possesses a $DHO:H_2O$ concentration of 1:2100. At the next cycle there is obtained water vapor or water in which the proportion of DHO to $H_2O$ is as 1:2000. This water is removed from vessel 14 through pipe 16 controlled by valve 17.

The process can be carried out at normal or at increased pressure.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In a technical process involving the production of hydrogen by the catalytically accelerated conversion of water gas with steam in excess of the stoichiometric requirement using as catalyst a mixture of caustic burned magnesite, finely ground calcined potassium carbonate and charcoal, the steps, for the production of water enriched with heavy water as a secondary product of said process, which consist in maintaining the reaction mixture, in the presence of said catalyst, at approximately 320° C. until equilibrium is substantially reached, condensing the residual water vapor enriched with deuterium hydroxide and deuterium oxide, reintroducing the enriched water into the conversion process, and removing from the process, and collecting, water enriched with deuterium hydroxide and deuterium oxide.

2. In a process for the production of hydrogen by the catalytically accelerated conversion of water gas with an amount of steam in excess of the stoichiometric requirement, the conversion being effected in two working stages, while employing as catalyst a mixture of caustic burned magnesite, finely ground calcined potassium carbonate and wood charcoal, in which magnesite and potassium carbonate are each contained in a proportion of 15%, and wood charcoal in a proportion of 70%, the steps, for the production of water enriched with heavy water, which consist in carrying out the first of the said steps within a temperature range of 400° to 500° C. and maintaining a temperature of about 320° C. in the second of the said steps until equilibrium in the gaseous phase is substantially reached, condensing the residual water vapor enriched with deuterium hydroxide and deuterium oxide, reintroducing the thus enriched water into the reduction process, while supplementing it with steam in such an amount that the water vapor is present in the same proportion as in the starting mixture, repeating the said steps, and finally removing and collecting the water enriched with deuterium hydroxide and deuterium oxide.

3. In a technical process involving the conversion of carbon monoxide, with steam in excess of the stoichiometric requirement, to carbon dioxide and hydrogen, with catalytically accelerated establishing of equilibrium, the steps, for the production of water enriched with heavy water as a secondary product of said process, which consist in maintaining the reaction mixture, in the presence of a catalyst, substantially at temperatures between 300° and 500° C. until the equilibrium $CO+H_2O \rightleftarrows CO_2+H_2$ is substantially reached, condensing the residual water vapor enriched with deuterium hydroxide and deuterium oxide, reintroducing the enriched water into the conversion process, and removing from the process, and collecting, water enriched with deuterium hydroxide and deuterium oxide.

4. In a technical process involving the conversion of carbon monoxide, with steam in excess of the stoichiometric requirement, to carbon dioxide and hydrogen, with catalytically accelerated establishing of equilibrium, the steps, for the production of water enriched with heavy water as a secondary product of said process, which consist in maintaining the reaction mixture, in the presence of a catalyst, substantially at temperatures between 300° and 500° C. until the equilibrium $CO+H_2O \rightleftarrows CO_2+H_2$ is substantially reached, condensing the residual water vapor enriched with deuterium hydroxide and deuterium oxide, repeatedly reintroducing the thus enriched water into the conversion process, and removing from the process, and collecting, the water thus progressively enriched with deuterium hydroxide and deuterium oxide.

5. In a technical process involving the conversion of carbon monoxide, with steam in excess of the stoichiometric requirement, to carbon dioxide and hydrogen, with catalytically accelerated establishing of equilibrium, conversion being effected in a plurality of stages at progressively lower temperatures, the steps, for the production of water enriched with heavy water as a secondary product of said process, which consist in maintaining the reaction mixture, in the presence of a catalyst, substantially at temperatures between 300° and 500° C. until the equilibrium $CO+H_2O \rightleftarrows CO_2+H_2$ is substantially reached, condensing the residual water vapor enriched with deuterium hydroxide and deuterium oxide, reintroducing the enriched water into the conversion process, and removing from the process, and collecting, water enriched with deuterium hydroxide and deuterium oxide.

6. In a technical process involving the conversion of carbon monoxide, with steam in excess of the stoichiometric requirement, to carbon dioxide and hydrogen, with catalytically accelerated establishing of equilibrium, the steps, for the production of water enriched with heavy water as a secondary product of said process, which consist in maintaining the reaction mixture, in the presence of a catalyst capable of accelerating the establishment of equilibrium both in the conversion reaction and in the reaction $DHO+H_2 \rightleftarrows DH+H_2O$, substantially at temperatures between 300° and 500° C. until the equilibrium $CO+H_2O \rightleftarrows CO_2+H_2$ is substantially reached, condensing the residual water vapor enriched with deuterium hydroxide and deuterium oxide, reintroducing the enriched water into the conversion process, and removing from the process, and collecting, water enriched with deuterium hydroxide and deuterium oxide.

FRITZ HANSGIRG.